July 24, 1962
L. G. KING ETAL
3,046,235
PROCESS TREATMENT OF GASES FROM THE REGENERATION
OF A PLATINUM GROUP METAL HYDROFORMING CATALYST
Filed Dec. 1, 1959
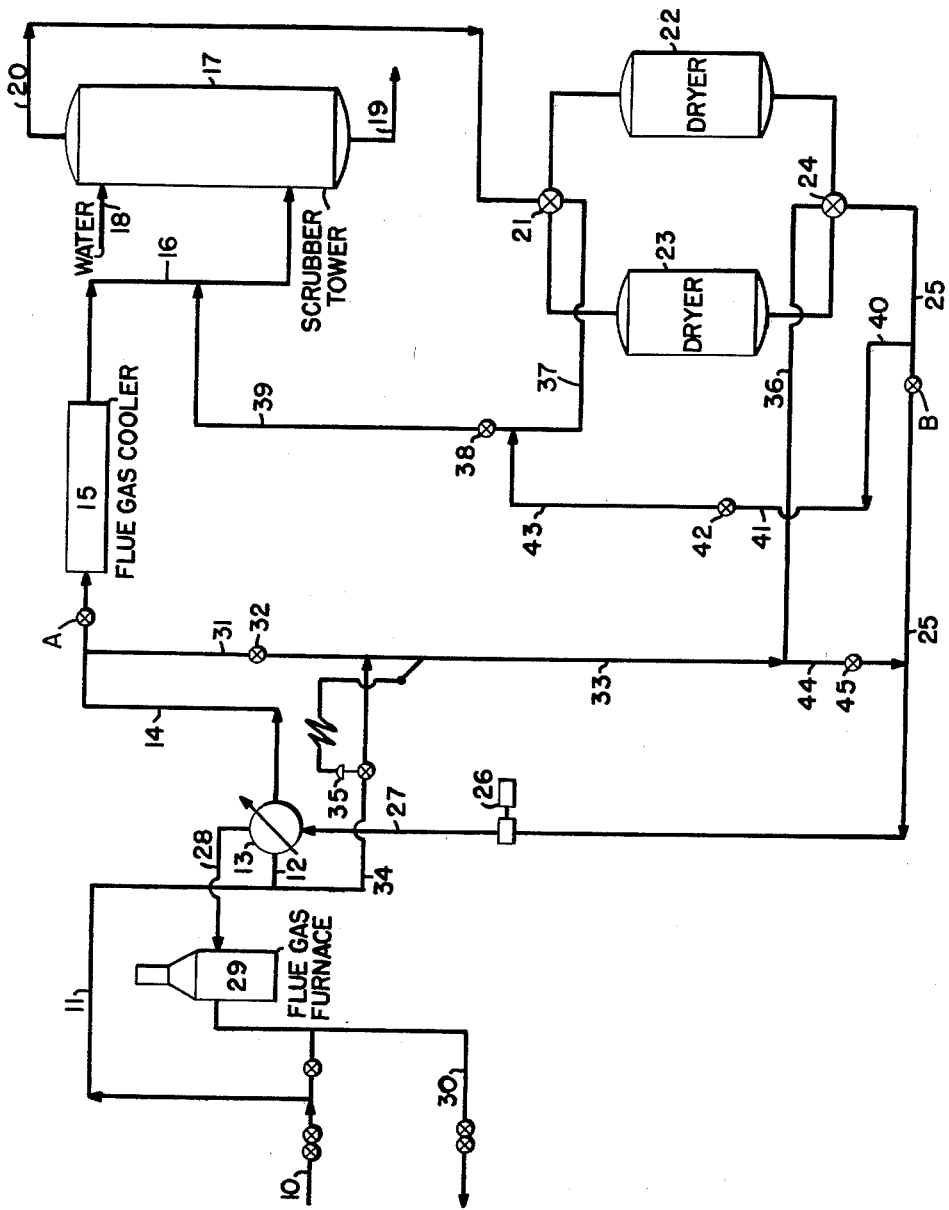
Lewis G. King
Jerome Bernstein    Inventors
Herbert P. Dengler
By *H. M. Feyrer*
Patent Attorney

United States Patent Office

3,046,235
Patented July 24, 1962

3,046,235
PROCESS TREATMENT OF GASES FROM THE REGENERATION OF A PLATINUM GROUP METAL HYDROFORMING CATALYST
Lewis G. King, Westfield, Jerome Bernstein, Plainfield, and Herbert P. Dengler, Fair Haven, N.J., assignors to Esso Research and Engineering Company, a corporation of Delaware
Filed Dec. 1, 1959, Ser. No. 856,595
6 Claims. (Cl. 252—411)

This process relates to the treatment of gases and more particularly to the treatment of gases formed in the regeneration of platinum-on-alumina hydroforming catalysts and recycled or reused in the regeneration of such catalysts.

Reforming or hydroforming of petroleum naphthas in contact with platinum-on-alumina catalysts is now well known and widely used in the petroleum industry for the production of high octane number motor gasolines. When conducted at about 850–1000° F. and at relatively high pressures of about 450–500 p.s.i.g. and above, and correspondingly high hydrogen partial pressures, this process is substantially continuous or non-regenerative. Under these conditions, however, it is not economically feasible to produce motor gasolines having a Research Clear octane number above about 93–95. Accordingly, it is necessary, in order to meet present day premium motor gasoline quality requirements, to carry out the hydroforming reaction below about 450 p.s.i.g. Under these conditions carbonaceous deposits gradually accumulate upon the catalyst deactivating the same. It is possible to offset this loss in activity by increasing the temperature at which the reaction is conducted or by reducing the naphtha feed rate to the reaction zone. Ultimately, however, it is necessary to shut off the supply of naphtha to the catalyst bed, strip or purge it of strippable, combustible materials and then burn off the inactivating carbonaceous deposits and then further reactivate the catalyst with a high temperature air or oxygen treat and also, desirably, a treatment with chlorine or compounds yielding chlorine in the presence of oxygen or air.

The regeneration of the catalyst can be effected, one reactor at a time, by inserting a swing reactor for the reactor undergoing regeneration, or the entire series of reactors can be regenerated at one time. In either case, in order to avoid deactivation or permanent damage to the catalyst, it is necessary to control carefully the temperature at which carbon burning occurs. This has been done by diluting the regeneration air with a non-combustible gas, such as steam, or an inert gas, such as nitrogen or flue gas. Steam is generally not desirable as the diluent because of the fact that it tends to strip halogen from the catalyst and thus lessens its activity.

It is the object of this invention to provide a process for forming a satisfactory diluent gas for use in the regeneration of platinum-alumina hydroforming catalysts.

It is a further object of this invention to provide a dry or low water content diluent gas for the regeneration of platinum-alumina hydroforming catalysts in a simple and economic manner.

These and other objects will appear more clearly from the detailed specification and claims which follow.

It has now been found that diluent gas for the regeneration of platinum-alumina hydroforming catalysts can be readily and economically prepared by withdrawing the gases formed in the regeneration of such catalysts and passing them through a scrubbing tower to remove corrosive acid gases therefrom and cool and dehumidify same. Use of a scrubbing tower is especially advantageous in this connection because cooling of the hot stream of regeneration gases to the same temperature levels by indirect heat exchange would result in severe corrosion of such exchangers through condensation of the acid gases. The scrubbed gases are then passed through a bed of solid adsorbent or drier such as activated alumina, silica gel or certain zeolites, or calcium aluminum silicates, or molecular sieves. In the arrangement in accordance with this invention, a pair of drier vessels is used so that one can be onstream while the other is subjected to regeneration or reactivation. Also in accordance with this invention, a temperature controlled stream of hot, fresh gas from the regeneration of a platinum-on-alumina catalyst is used to reactivate the drier undergoing regeneration.

The use of a hot sidestream of gas from the regeneration of a reactor vessel assures a constant source gas at the proper temperature to effect a good reactivation of the drier. One of the most important variables in the reactivation of the drier vessel is the temperature of the gas used to heat the drier and remove the adsorbed water. An alternate for heating the desiccant to 400° F. plus, the temperature found by experience to be necessary to effect good drier reactivation, would be the relatively costly use of high pressure steam. This invention avoids the need for such high pressure steam or other expensive hot desorption gas stream. The reactivation is upflow at line pressure and the reactivation gases discharged from the drier are phased to the scrubbing tower in order to scrub out corrosive acid gases, cool and dehumidify the same. In this way the scrubbing tower eliminates the need for separate cooling and water knockout facilities for the drier reactivation gases. Also, in accordance with the present invention a portion of the cool, dry regeneration gas taken downstream of the onstream drier is used to cool the reactivated drier before placing it back onstream. The use of a dry (15 p.p.m. $H_2O$) stream to cool the drier insures maximum capacity for the freshly reactivated drier (since any moisture in the cooling gas will be adsorbed on the desiccant as the bed temperature approaches the cooling gas temperature).

Reference is made to the accompanying drawing illustrating a diagrammatic flow plan in accordance with the present invention.

In the drawing, 10 is the outlet line from a reactor vessel charged with a platinum-alumina catalyst undergoing regeneration. The flue gases at about 750 to 1050° F. pass through lines 11 and 12 to heat exchanger 13 wherein they are cooled to about 400–600° F. by indirect heat exchange with the scrubbed and dried recycle flue gas. The partially cooled flue gas is then passed via line 14 to flue gas cooler 15 wherein it is further cooled to about 200° F. This cooler may be of the air fin type, but is not essential to this invention and may, therefore, be eliminated. The cooled flue gases are then passed via line 16 into the base of scrubber tower 17 wherein they are countercurrently contacted with water supplied at ambient temperature through line 18. The scrubbing liquid is removed from the bottom of the tower 17 through line 19. If desired, a 5° Bé. caustic solution or other suitable alkaline liquid may be used in place of water to aid in the elimination of carbon oxides from the gas stream.

The flue gases, scrubbed free of corrosive acid gases and cooled to about 80–90° F., are removed overhead from tower 17 via line 20 and passed through four-way valve 21 into drier tower 22 or 23 wherein the flue gas is dried to about 15 p.p.m. of water by contact with a suitable solid desiccant, preferably activated alumina, silica gel or certain zeolites. The dried flue gases are discharged from towers 22 or 23 through four-way valve 24 and passed thence through line 25 to compressor 26, line 27 to flue gas heat exchanger 13 wherein they are partially preheated, i.e., to about 400–600° F. by indirect heat exchange with the hot, fresh regeneration gases. The partially preheated dry recycle flue gas is then passed via line 28 to flue gas furnace 29 wherein it is heated to the desired temperature of 750 to 1050° F. and then passed via line 30 to the inlet of the hydroformer reactor vessel undergoing regeneration where suitable amounts of air or other agent, such as chlorine or carbon tetrachloride, can be added to complete the reactivation of the catalyst.

When a drier tower 22 or 23 requires regeneration, hot flue gas is passed from line 14 into line 31, through flow control valve 32 into line 33. In order to maintain a stream of drier tower regeneration gas at constant temperature in line 33, a branch line 34 is provided in line 12 upstream of the flue gas heat exchanger 13 for the supply of hot regeneration gas. A control valve 35 responsive to the temperature of the gases in line 33 is provided in line 34 to control the supply of hot regeneration gas. Ordinarily it is desirable to have the drier reactivation gas at a temperature of about 550° F. In the arrangement shown, a constant drier reactivation gas temperature is possible regardless of the operation being performed in the hydroforming reactor regeneration cycle. The drier reactivation gas at constant temperature passes from lines 33 and 36 through four-way valve 24 and thence upflow through drier tower 22 or 23. The hot, water-enriched drier regeneration gas passes overhead from tower 22 or 23 through four-way valve 21 into line 37, through valve 38 and line 39 into line 16 and thence into scrubber tower 17 in admixture with the main stream of regeneration gas. When the solid desiccant material in drier towers 22 or 23 has been regenerated or stripped of adsorbed water by the hot regeneration gases, the supply of the latter is shut off by closing valve 32 and valve 38 is also closed. A side stream of cold, dry gas is taken off line 25 at 40 downstream of the onstream drier tower and passed through line 41, valve 42, line 43 into line 37 thence through four-way valve 21 into the top of the hot, freshly regenerated drier tower. The cooling gases are withdrawn from the bottom of the drier tower, passed through four-way valve 24 into the line 36 and thence through line 44 and valve 45 into line 25 for intermixture with the main stream of dry recycle flue gas. A valve A is provided in the regenerator flue gas line 14 just downstream of takeoff line 31 and a valve B is provided in the cold recycle gas line 25 just downstream of the takeoff line 40. The heating of the drier tower for the regeneration of the desiccant is effected with valves 32 and 38 open and valves 42 and 45 closed and with valve A pinched on. The cooling of the hot regenerated drier tower is effected with valves 32 and 38 closed and valves 42 and 45 open and with valve B pinched on.

The following example is illustrative of the present invention.

A reactor vessel charged with a platinum-alumina catalyst containing about 0.25 to about 0.75 wt. percent platinum and about 0.5 to 1.0 wt. percent chlorine that had become deactivated by the hydroforming of naphtha at temperatures of about 900–1000° F. and pressures of about 100 to 400 p.s.i.g. is regenerated by supplying thereto a regeneration gas of the following composition.

Carbon dioxide _____ 8–10 vol. percent.
Oxygen _____ 0.5–1.0 vol percent.
HCl _____ Nil.
Water _____ 15–25 p.p.m. by wt.
Nitrogen _____ Remainder.

The gases formed in this regeneration which are supplied to line 10 of the flowplan in accordance with this invention is as follows:

Carbon dioxide _____ 9–11 vol. percent.
Oxygen _____ Nil.
HCl _____ 1–200 p.p.m. by vol.
$H_2O$ _____ 1000–1600 p.p.m. by wt.
Sulfur Dioxide _____ 0–40 p.p.m. by vol.[1]
Nitrogen _____ Remainder.

[1] Sulfur dioxide content is ordinarily very low (0–10 p.p.m.) because of pretreatment of the naphtha feed by hydrofining.

Larger amounts may be formed, however, if the catalyst becomes badly deactivated or excessive amounts of sulfide scale accumulate in the reactor because of an upset in the feed preparation.

The following tables summarize typical operating conditions in the flowplan shown.

*Typical Operating Conditions*

(a) ONE DRIER HEATING

| Name | Line Designation | Temp., °F | Press., p.s.i.g. | Flow Rate, s.c.f.m. |
|---|---|---|---|---|
| Reactor Outlet | 10 | 750–1050 | 100 | 21,500 |
| E-13 Outlet | 14 | 400–600 | 100 | 21,500 |
| Hot Slipstream | 31 | 400–600 | 100 | 7,500 |
| Hot React. Slipstream | 33 | 550 | 100 | 7,500 |
| Hot Stream leaving drier | 37 | 450 | 85 | 7,500 |
| Scrubbing Tower Overhead | 20 | 80–90 | 85 | 21,500 |
| Drier Outlet | 25 | 80–90 | 85 | 21,500 |
| E-13 Outlet | 20 | 400–600 | 115 | 21,500 |
| Flue Gas Furnace Outlet | 30 | 750–1050 | 115 | 21,500 |

Water Levels:
 (a) Scrubber Overhead—saturated at cooling water temp.
 (b) Drier Outlet—approx. 15 p.p.m. (wt.).
Heating Time—approx. 2.5 hrs.

(b) ONE DRIER COOLING

| Name | Line Designation | Temp., °F | Press., p.s.i.g. | Flow Rate, s.c.f.m. |
|---|---|---|---|---|
| Reactor Outlet | 10 | 750–1050 | 100 | 21,500 |
| E-13 Outlet | 14 | 400–600 | 100 | 21,500 |
| Scrubbing Tower Ovhd | 20 | 80–90 | 100 | 21,500 |
| Drier Outlet | 25 | 80–90 | 95 | 21,500 |
| Cooling React. Stream | 40 | 80–90 | 95 | 7,500 |
| Cooling Stream Lvg. Drier | 36 | 100 | 85 | 7,500 |
| E-13 Outlet | 28 | 400–600 | 115 | 21,500 |
| Flue Gas Furnace Outlet | 30 | 750–1050 | 115 | 21,500 |

Cooling Time—approx. 1.5 hours.

The drier outlet gas composition is, except for the addition of sufficient air to provide the 0.5 to 1.0 vol. percent oxygen, the same as the regeneration gas composition set out at the beginning of this example. If 5° Bé. caustic soda scrubbing is substituted for water scrubbing, the gas can be essentially freed of carbon dioxide.

The foregoing specification contains a limited number of embodiments of the present invention. It will be understood that numerous variations are possible without departing from the scope of this invention.

What is claimed is:

1. A method for drying flue gases from the regeneration of a platinum group metal hydroforming catalyst which comprises withdrawing hot flue gases from a hydroforming reactor undergoing regeneration, passing the flue gas through a tower for countercurrent contact with a cool scrubbing liquid to eliminate corrosive acid gases and cool and dehumidify the flue gases, passing the cooled and scrubbed gases through a bed of solid desiccant to dry the same preparatory to recycling to the hydroforming reactor undergoing regeneration and simultaneously regenerating an exhausted bed of solid desiccant by withdrawing a sidestream of hot flue gases, passing the said sidestream of hot flue gases through the spent bed of solid desiccant to dry and regenerate the same, combining the drier regeneration gases with the main stream of flue gases entering the scrubbing tower, withdrawing a sidestream of cooled and dried recycle flue gas, passing the sidestream of cooled and dried recycle flue gas through the hot bed of freshly regenerated desiccant and recombining the stream of cooling gas with the main stream of cooled, dried recycle flue gas and recycling the same to the hydroforming reactor undergoing regeneration.

2. A method for drying flue gases from the regeneration of a platinum group metal hydroforming catalyst which comprises withdrawing hot flue gases from a hydroforming reactor undergoing regeneration, partially cooling the hot flue gases by indirect heat exchange with scrubbed and dried recycle flue gas, passing the partially cooled flue gas through a tower for countercurrent contact with a cool scrubbing liquid to eliminate corrosive acid gases and cool and dehumidify the flue gases, passing the cooled and scrubbed gases through a bed of solid desiccant to dry the same preparatory to recycling to the hydroforming reactor undergoing regeneration and simultaneously regenerating an exhausted bed of solid desiccant by withdrawing a sidestream of hot flue gases, passing the said sidestream of hot flue gases through the spent bed of solid desiccant to dry and regenerate the same, combining the drier regeneration gases with the main stream of flue gases entering the scrubbing tower, withdrawing a sidestream of cooled and dried recycle flue gas, passing the sidestream of cooled and dried recycle flue gas through the hot bed of freshly regenerated desiccant and recombining the stream of cooling gas with the main stream of cooled, dried recycle flue gas and recycling the same to the hydroforming reactor undergoing regeneration.

3. The method as defined in claim 2 in which the sidestream of flue gases for the regeneration of the spent bed of solid desiccant is maintained at the desired temperature for regeneration of the desiccant by mixing partially cooled flue gas with the hot flue gases at essentially the same temperature as the flue gases leaving the reactor vessel undergoing regeneration.

4. A method for drying flue gases from the regeneration of a platinum group metal hydroforming catalyst which comprises withdrawing hot flue gases from a hydroforming reactor undergoing regeneration, passing the flue gas through a tower for countercurrent contact with a cool aqueous scrubbing liquid to eliminate corrosive acid gases and cool and dehumidify the flue gases, passing the cooled and scrubbed gases through a bed of solid desiccant to dry the same to a water content of about 15–25 p.p.m. by weight preparatory to recycling to the hydroforming reactor undergoing regeneration and simultaneously regenerating an exhausted bed of solid desiccant by withdrawing a sidestream of hot flue gases, passing the said sidestream of hot flue gases through the spent bed of solid desiccant to dry and regenerate the same, combining the drier regeneration gases with the main stream of flue gases entering the scrubbing tower, withdrawing a sidestream of cooled and dried recycle flue gas, passing the sidestream of cooled and dried recycle flue gas through the hot bed of freshly regenerated desiccant and recombining the stream of cooling gas with the main stream of cooled, dried recycle flue gas and recycling the same to the hydroforming reactor undergoing regeneration.

5. A method for drying flue gases from the regeneration of a platinum group metal hydroforming catalyst which comprises withdrawing hot flue gases from a hydroforming reactor undergoing regeneration, partially cooling the hot flue gases by indirect heat exchange with scrubbed and dried recycle flue gas, passing the partially cooled flue gas through a tower for countercurrent contact with a cool agueous scrubbing liquid to eliminate corrosive acid gases and cool and dehumidify the flue gases, passing the cooled and scrubbed gases through a bed of solid desiccant to dry the same to a water content of about 15–25 p.p.m. by weight preparatory to recycling to the hydroforming reactor undergoing regeneration and simultaneously regenerating an exhausted bed of solid desiccant by withdrawing a sidestream of hot flue gases, passing the said sidestream of hot flue gases through the spent bed of solid desiccant to dry and regenerate the same, combining the drier regeneration gases with the main stream of flue gases entering the scrubbing tower, withdrawing a sidestream of cooled and dried recycle flue gas, passing the sidestream of cooled and dried recycle flue gas through the hot bed of freshly regenerated desiccant and recombining the stream of cooling gas with the main stream of cooled, dried recycle flue gas and recycling the same to the hydroforming reactor undergoing regeneration.

6. The method as defined in claim 5 in which the sidestream of flue gases for the regeneration of the spent bed of solid desiccant is maintained at the desired temperature for regeneration of the desiccant by mixing partially cooled flue gas with the hot flue gases at essentially the same temperature as the flue gases leaving the reactor vessel undergoing regeneration.

References Cited in the file of this patent
UNITED STATES PATENTS
2,908,653   Hengstebeck _____ Oct. 13, 1959